United States Patent
Cho et al.

(10) Patent No.: US 12,541,592 B2
(45) Date of Patent: Feb. 3, 2026

(54) MALICIOUS BEHAVIOR DETECTION METHOD FOR DETECTING MALICIOUS BEHAVIOR BY ANALYZING PROGRAM CODE, RECORDING MEDIUM AND APPARATUS FOR PERFORMING THE SAME

(71) Applicant: Foundation of Soongsil University-Industry Cooperation, Seoul (KR)

(72) Inventors: Haehyun Cho, Seoul (KR); Jeonghyun Yi, Daejeon (KR); Minho Kim, Seoul (KR); Gwangyeol Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 97 days.

(21) Appl. No.: 18/578,615

(22) PCT Filed: Nov. 23, 2023

(86) PCT No.: PCT/KR2023/018984
§ 371 (c)(1),
(2) Date: Jan. 11, 2024

(87) PCT Pub. No.: WO2025/053346
PCT Pub. Date: Mar. 13, 2025

(65) Prior Publication Data
US 2025/0094578 A1      Mar. 20, 2025

(30) Foreign Application Priority Data
Sep. 5, 2023   (KR) .................. 10-2023-0117735

(51) Int. Cl.
G06F 21/00    (2013.01)
G06F 21/56    (2013.01)

(52) U.S. Cl.
CPC ........ *G06F 21/56* (2013.01); *G06F 2221/034* (2013.01)

(58) Field of Classification Search
CPC .................. G06F 2221/034; G06F 21/56
(Continued)

(56) References Cited

U.S. PATENT DOCUMENTS

| 2009/0158260 A1* | 6/2009 | Moon ............... G06F 11/3612 717/133 |
| 2017/0177868 A1 | 6/2017 | Hay et al. ............ G06F 21/565 |

(Continued)

FOREIGN PATENT DOCUMENTS

| CN | 113254934 | * | 8/2021 | ............. G06F 21/56 |
| KR | 10-2009-0065277 A | | 6/2009 | |

(Continued)

OTHER PUBLICATIONS

Fei Peng et al., "X-Force: Force-Executing Binary Programs for Security Applications", Aug. 2014.
(Continued)

*Primary Examiner* — Josnel Jeudy
(74) *Attorney, Agent, or Firm* — Stein IP, LLC

(57) ABSTRACT

A method of detecting malicious behavior in a malicious behavior detection apparatus that detects malicious behavior by analyzing the code of a program, comprises generating a first control flow graph (CFG) by performing dynamic analysis on the program, generating a second CFG by extracting a code block that is likely to be executed by a conditional branch instruction included in the program, and comparing the first CFG and the second CFG to detect hidden code included in the program, and detecting a malicious behavior of the program by determining whether the detected hidden code is a malicious code. According to the constitutions, the time it takes to discover and respond to
(Continued)

new types of malicious code can be shorten by extracting hidden code related to the malicious behavior and detecting malicious behavior.

11 Claims, 6 Drawing Sheets

(58) Field of Classification Search
USPC .......................................................... 726/23
See application file for complete search history.

(56) References Cited

U.S. PATENT DOCUMENTS

2018/0095764 A1* 4/2018 Sultana ................. G06F 9/3806
2021/0264029 A1* 8/2021 Yoo ..................... G06F 16/9024

FOREIGN PATENT DOCUMENTS

| | | | | |
|---|---|---|---|---|
| KR | 10-0926115 B1 | 11/2009 | | |
| KR | 10-1013417 B1 | 2/2011 | | |
| KR | 10-1228899 B1 | 2/2013 | | |
| KR | 101803890 B1 * | 12/2017 | ......... | H04L 63/1441 |
| KR | 10-1969572 B1 | 4/2019 | | |
| KR | 10-2392559 B1 | 4/2022 | | |
| KR | 10-2392642 B1 | 4/2022 | | |
| KR | 10-2415971 B1 | 7/2022 | | |
| KR | 10-2023-0062204 A | 5/2023 | | |

OTHER PUBLICATIONS

Office Action mailed Jun. 11, 2024, issued to corresponding Korean Application No. 10-2023-0117735.
Office Action mailed Nov. 25, 2024, issued to corresponding Korean Application No. 10-2023-0117735.

* cited by examiner

FIG. 3

```
1   Initialize all environments
2   Set Program's Entry Point as root_node
3   Execute find_cond_branch func recursively
4
5   function find_cond_branch (node, visited) {
6       Return when the node is already visited
7       Add the node in visited node
8       Check the node is conditional branch
9       try {
10          Set target address as root_node
11          Execute fine_cond_branch func
12      } catch {
13          Continue the function call
14      }
15  }
```

MALICIOUS BEHAVIOR DETECTION METHOD FOR DETECTING MALICIOUS BEHAVIOR BY ANALYZING PROGRAM CODE, RECORDING MEDIUM AND APPARATUS FOR PERFORMING THE SAME

CROSS-REFERENCE TO RELATED APPLICATIONS

This application is a national stage of International Application No. PCT/KR2023/018984, filed Nov. 23, 2023, which claims the benefit of Korean Application No. 10-2023-0117735, filed Sep. 5, 2023, in the Korean Intellectual Property Office, the disclosures of which are incorporated herein by reference.

TECHNICAL FIELD

The present invention relates to a method for detecting malicious behavior that can respond to new types of a malicious code, and a recording medium and apparatus for performing the method.

BACKGROUND ART

As the IoT market continues to grow, IoT devices are increasing every year, and as the importance of mobile devices increases in this environment, the mobile application market is also growing rapidly. As a result, the scale of mobile application malicious code is increasing day by day.

According to some reports, the number increased from about 20 million in 2017 to about 36 million in 2019. Malicious applications continue to be created rapidly, at an average rate of about 15 per minute.

Therefore, there is a need to protect users by more precisely detecting applications that perform malicious behaviors among mobile applications. Existing malicious behavior detection methods include static analysis methods and dynamic analysis methods.

Malicious code detection methods using these static or dynamic analysis methods focus on using the characteristics of the entire program or analyzing only the execution results.

Specifically, the static analysis method is a method of analyzing information that can be obtained without executing a program. In order to quickly detect malicious code, it mainly calculates the signature of the program and compares it with the signature of already detected malicious code.

Meanwhile, the dynamic analysis method is a method of executing the program directly and analyzing information that can be obtained during the execution process. It is a method of executing the program in a sandbox environment and analyzing the execution results to evaluate the presence or absence of malicious code and the impact of the malicious code on the system.

A representative example of utilizing these analysis methods is endpoint services. These services monitor whether programs within the system are performing actions that attack the system, similar to the actions of well-known malicious code. Alternatively, signatures of malicious code are used to quickly detect malicious code.

However, although conventional static or dynamic analysis methods are effective in detecting well-known malicious code, they are limited in responding to new types of malicious code and have limitations in that it takes a lot of time to respond. This is confirmed through the time it takes for a zero-day attack to be discovered, which is published every year in analysis reports from anti-virus vendors.

Therefore, a new malicious behavior detection method is needed that can not only respond to new types of malicious code, but also shorten the time required to respond to them.

RELATED ART

Korean Patent Registration No. 10-1228899

DISCLOSURE

Technical Issues

The present invention is suggested to solve the above problems, and the purpose of the present invention is to provide a malicious behavior detection method that extracts hidden code related to a malicious behavior and detects a malicious behavior to discover new types of malicious code and reduces the time required to respond them by analyzing the code of a program, and a recording medium and apparatus for performing the same.

Technical Solution

In order to achieve the above object, according to an embodiment of the present invention, a method for detecting a malicious behavior in a malicious behavior detection apparatus that detects a malicious behavior by analyzing code of a program comprises generating a first control flow graph (CFG) by performing dynamic analysis on the program, generating a second CFG by extracting a code block that is likely to be executed by a conditional branch instruction included in the program, and comparing the first CFG and the second CFG to detect hidden code included in the program, and detecting a malicious behavior of the program by determining whether the detected hidden code is malicious code.

Further, the generating the second CFG may comprise generating the second CFG while executing the program using a forced execution engine.

Further, the generation of the second CFG may comprise setting an entry point of the program as a starting point of the forced execution engine, and detecting whether the conditional branch instruction exists in a confirmed node while executing the program using the forced execution engine.

Further, the detection of whether the conditional branch instruction exists may comprise setting, if the conditional branch instruction exists in the confirmed node, a target address of the conditional branch instruction to a root node, repeatedly calling the root node so as to operate recursively to extract all nodes that are likely to be executed as the code block, and generating the second CFG.

Further, the detection of whether the conditional branch instruction exists may comprise preventing duplicate inspection by checking whether each confirmed node has a history of inspection through a preset function.

Further, the hidden code may be code that exists in the second CFG but does not exist in the first CFG.

Further, the detection of the malicious behavior may comprise analyzing a pattern of the hidden code and splitting the hidden code into at least one or more to generate a split CFG, generating a signature for each split CFG, and determining that the hidden code is malicious code if the generated signature exists in a database storing signatures of malicious code prepared in advance.

Further, in order to achieve the above object, a computer-readable recording medium, on which a computer program for performing the malicious behavior detection method according to one embodiment of the present invention is recorded, is provided.

Further, in order to achieve the above object, according to an embodiment of the present invention, a malicious behavior detection apparatus for detecting malicious behavior by analyzing the code of a program comprises an information extraction unit that generates a first control flow graph (CFG) by performing dynamic analysis on the program, a code execution unit that generates a second CFG by extracting a code block that is likely to be executed by a conditional branch instruction included in the program, and a hidden code analysis unit that compares the first CFG and the second CFG to detect hidden code included in the program, and detects a malicious behavior of the program by determining whether the detected hidden code is malicious code.

Further, the code execution unit may generate the second CFG while executing the program using a forced execution engine.

Further, the code execution unit may set an entry point of the program as a starting point of the forced execution engine and detect whether the conditional branch instruction exists in a confirmed node while executing the program using the forced execution engine.

Further, the code execution unit may set, if the conditional branch instruction exists in the confirmed node, a target address of the conditional branch instruction to a root node, repeatedly call the root node so as to operate recursively to extract all nodes that are likely to be executed as the code block, and generate the second CFG.

Further, the code execution unit may prevent duplicate inspection by checking whether each confirmed node has a history of inspection through a preset function.

Further, the hidden code may be code that exists in the second CFG but does not exist in the first CFG.

Further, the hidden code analysis unit may comprise a pattern analysis unit that analyzes a pattern of the hidden code and splits the hidden code into at least one or more to generate a split CFG, and a signature generation unit that generates a signature for each split CFG, wherein the hidden code analysis unit may determine that the hidden code is a malicious code if the generated signature exists in a database storing signatures of malicious code prepared in advance.

Advantageous Effects

According to one aspect of the present invention described above, by providing a malicious behavior detection method for detecting a malicious behavior by analyzing the code of a program, and a recording medium and apparatus for performing the same, the time it takes to discover and respond to new types of malicious code can be shorten by extracting hidden code related to the malicious behavior and detecting malicious behavior.

BRIEF DESCRIPTION OF DRAWINGS

These and/or other aspects will become apparent and more readily appreciated from the following description of the embodiments, taken in conjunction with the accompanying drawings in which:

FIG. 3 is a diagram for explaining a forced execution engine used in the code execution unit according to an embodiment of the present invention;

DETAILED DESCRIPTION OF EMBODIMENTS

Figure 1:
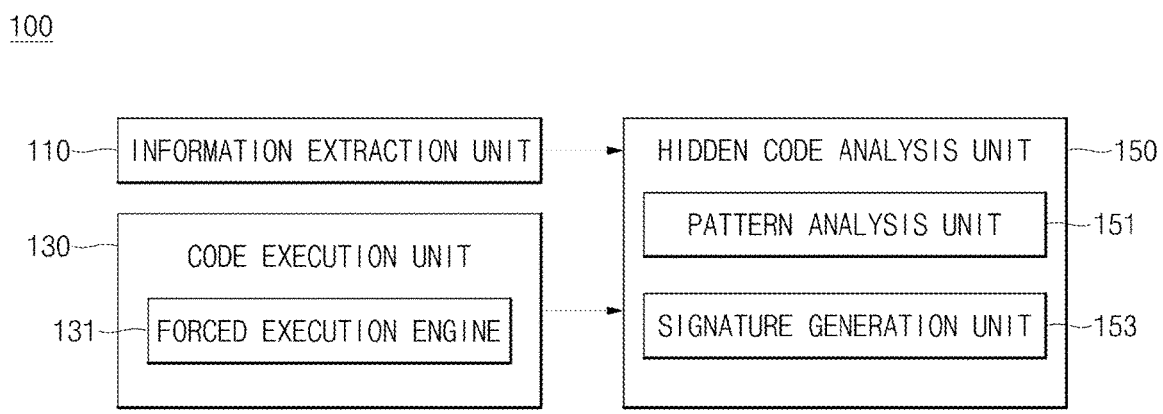
FIG. 1 is a block diagram illustrating the configuration of a malicious behavior detection apparatus according to an embodiment of the present invention.

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if properly described, is limited only by the appended claims, along with all equivalents as claimed by those claims. Like reference numbers in the drawings indicate the same or similar function throughout the various aspects.

In addition, the components according to the present invention are components defined not by physical division but by functional division, and may be defined by the functions that each performs. Each component may be implemented as hardware or program codes and processing units that perform respective functions, and functions of two or more components may be included in one component and implemented. Therefore, the names given to the components in the following embodiments are not to physically distinguish each component, but to imply the representative function performed by each component, and it should be noted that the technical idea of the present invention is not limited by the names of the components.

Hereinafter, preferred embodiments of the present invention will be described in more detail with reference to the drawings.

Figure 2:
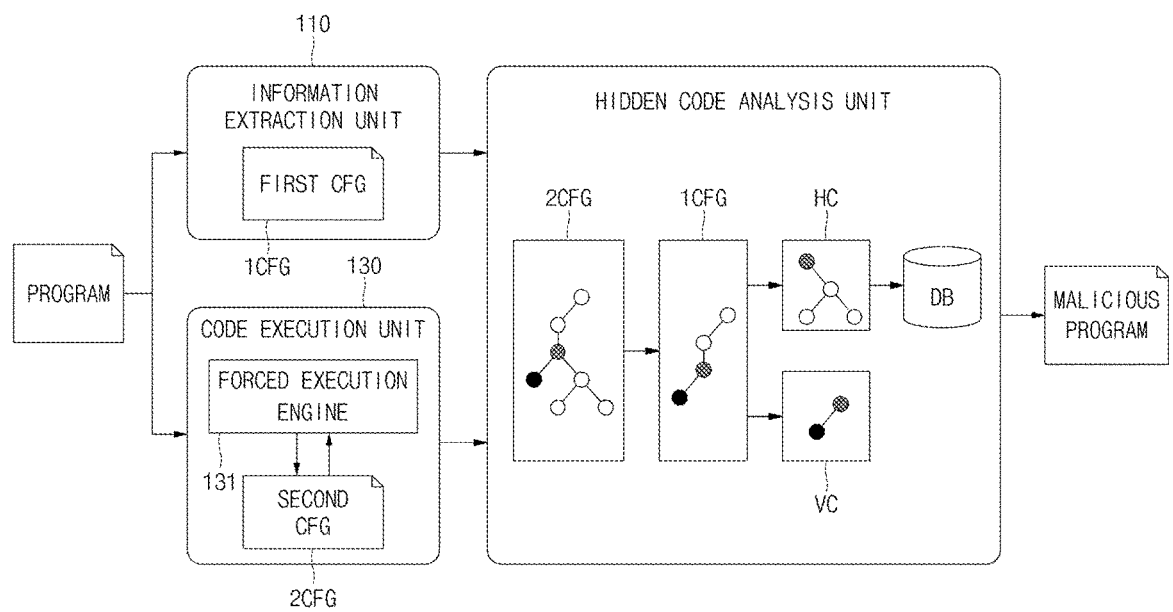
FIG. 2 is a block diagram specifically illustrating the process of detecting malicious behavior in a malicious behavior detection apparatus according to an embodiment of the present invention.

FIG. 1 is a block diagram for explaining the configuration of a malicious behavior detection apparatus 100 according to an embodiment of the present invention, and FIG. 2 is a block diagram for specifically explaining a process of detecting malicious behavior in the malicious behavior detection apparatus 100 according to an embodiment of the present invention.

The malicious behavior detection apparatus 100 (hereinafter referred to as the apparatus) according to this embodiment can quickly respond to new types of malicious code by analyzing the code of the program to find hidden code and analyzing whether the hidden code is related to a malicious behavior.

To this end, the apparatus 100 according to this embodiment may comprise an information extraction unit 110, a code execution unit 110, and a hidden code analysis unit 150. In addition, software (application) for performing a malicious behavior detection method may be installed and executed in the apparatus 100, and the information extraction unit 110, code execution unit 110, and hidden code analysis unit 150 can be controlled by software (application) to perform a malicious behavior detection method.

At this time, the apparatus 100 may be a separate terminal or a partial module of the terminal. Additionally, the information extraction unit 110, code execution unit 110, and hidden code analysis unit 150 may be formed as an integrated module or may be comprised of one or more modules. However, on the contrary, each component may be comprised of a separate module.

Additionally, the apparatus 100 may be mobile or fixed. This apparatus 100 may be in the form of a server or engine, and may be called by other terms such as a device, terminal, user equipment (UE), mobile station (MS), wireless device or handheld device. And the apparatus 100 can execute or produce various software based on an operating system (OS), that is, a system. Here, the operating system is a system program that allows software to use the hardware of the apparatus, and includes both mobile computer operating systems such as Android OS, iOS, Windows Mobile OS, Bada OS, Symbian OS, and Blackberry OS, as well as computer operating systems such as Windows, Linux, Unix, MAC, AIX, and HP-UX.

In addition, although not shown in the drawing, the apparatus 100 may further include a storage unit in which a program for performing a malicious behavior detection method is recorded. This storage unit temporarily or permanently stores data processed by the information extraction unit 110, code execution unit 110, and hidden code analysis unit 150, and may include a volatile storage medium or a non-volatile storage medium. However, the scope of the present invention is not limited thereto.

First, the information extraction unit 110 according to this embodiment generates a first control flow graph (CFG) by performing dynamic analysis on the input program as shown in FIG. 2.

This information extraction unit 110 can generate the first CFG (1CFG) through the execution result for 'Normal Run Code' using a conventional dynamic analysis method.

Here, the dynamic analysis method may mean executing a program in an environment similar to a general malicious code analysis environment using a framework such as dynamic binary instrumentation (DBI) or a CPU emulator.

In addition, 'Normal Run Code' can refer to code that is executed when the program's execution results are not affected by not manipulating the program's execution flow when analyzing the program through dynamic analysis methods, etc.

In particular, the first CFG (1CFG) generated by the information extraction unit 110 according to this embodiment through this 'Normal Run Code' means a state having no information about the hidden code (HC) that is executed only in a specific environment and under specific conditions.

The information extraction unit 110 may transmit the generated first CFG (1CFG) to the hidden code analysis unit 150.

Meanwhile, the code execution unit 110 may generate a second CFG (2CFG) by extracting a code block that is likely to be executed by a conditional branch instruction included in the program.

To this end, the code execution unit 110 includes a forced execution engine 131, and FIG. 3 is a drawing for explaining the forced execution engine 131 used in the code execution unit 110 according to an embodiment of the present invention.

Searching for a program's conditional branch instructions and finding all code blocks that are executed according to the results of the conditional branch instructions means completely tracing and analyzing the program's execution path.

Accordingly, the code execution unit 110 according to this embodiment may use the forced execution engine 131 to find all paths through which the program can reach, and generate a second CFG (2CFG) containing hidden code (HC) that operates only in specific environments and conditions.

To this end, the code execution unit 110 may initialize an environment for executing the program code.

The code execution unit 110 may set the entry point of the program as the starting point of the forced execution engine 131.

Additionally, the code execution unit 110 may use the forced execution engine 131 to detect whether a conditional branch instruction exists within the confirmed node while executing the program.

At this time, the forced execution engine 131 can check all nodes of the graph according to the graph search algorithm while executing the program.

If a conditional branch instruction exists in the confirmed node, the code execution unit 110 may set the target address of the conditional branch instruction to the root node, repeatedly call the root node so as to operate recursively to extract all nodes that are likely to be executed as a code block, and generate a second CFG (2CFG).

Additionally, the code execution unit 110 may prevent duplicate inspection by checking whether each confirmed node has a history of inspection through a preset function.

Here, checking by the code execution unit 110 whether the selected node of the graph is a node that has already been visited may mean using the find_cond_branch function as shown in FIG. 3.

For example, it is assumed as an example that a conditional branch instruction exists in the selected node, and the branched nodes in the graph are the right subnode and the left subnode. In this case, a description of how the code execution unit 110 repeatedly calls the root node so as to operate recursively may be as follows.

First, if a conditional branch instruction exists in the selected node, the code execution unit 110 may set the target address of the conditional branch instruction to root_node as shown in FIG. 3. And, for example, the code execution unit 110 may first check the right subnode.

After all checking of the right subnode is completed, the code execution unit 110 may return to root_node and check the left subnode to discover all conditional branch instructions and target addresses.

Additionally, the code execution unit 110 may generate a code block executed by a conditional branch instruction as data in CFG format.

Through the above process, the code execution unit 110 may generate the second CFG (2CFG), and transmit the generated second CFG (2CFG) to the hidden code analysis unit 150.

Meanwhile, the hidden code analysis unit 150 may receive the first CFG (1CFG) from the information extraction unit 110 and receive the second CFG (2CFG) from the code execution unit 110.

The hidden code analysis unit 150 may compare the first CFG (1CFG) and the second CFG (2CFG) to detect the hidden code (HC) included in the program.

Additionally, the hidden code analysis unit 150 can detect malicious behavior of the program by determining whether the detected hidden code (HC) is malicious code.

Figure 4:
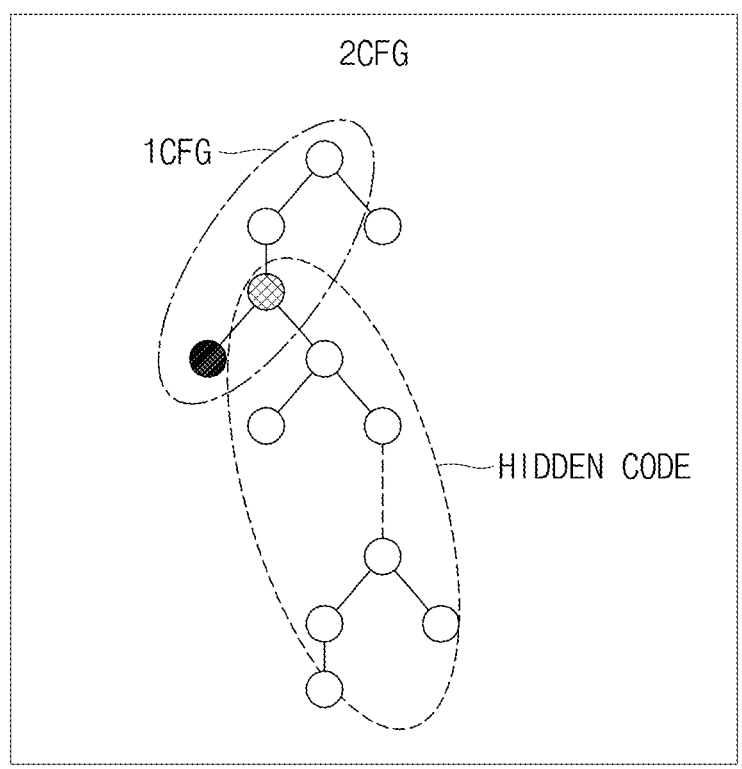
FIG. 4 is an example diagram for explaining the process of detecting a hidden code in a hidden code analysis unit according to an embodiment of the present invention.

FIG. 4 is an example diagram for explaining the process of detecting a hidden code (HC) in the hidden code analysis unit 150 according to an embodiment of the present invention. As shown in FIG. 4, the hidden code analysis unit 150 may detect the hidden code (HC) included in the program by comparing the first CFG (1CFG) and the second CFG (2CFG). In other words, among all code blocks included in the second CFG (2CFG), that is, nodes, the node corresponding to the first CFG (1CFG) can be classified as visible code (VC).

Here, the visible code (VC) may mean normal code or code that causes malicious behavior, but it is code included in the first CFG (1CFG), that is, code that can be sufficiently checked through existing dynamic analysis methods. Since it is not an important part in the present invention, detailed explanation will be omitted.

Meanwhile, the hidden code analysis unit 150 may classify a node that exists in the second CFG (2CFG) but does not exist in the first CFG (1CFG), that is, the corresponding code block, as hidden code (HC).

Figure 5:
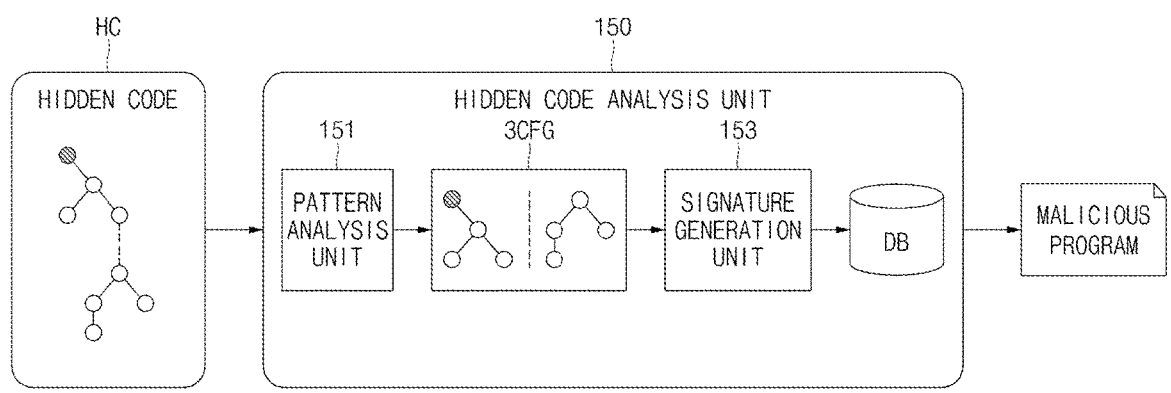
FIG. 5 is a block diagram for explaining the configuration of a hidden code analysis unit according to an embodiment of the present invention.

FIG. 5 is a block diagram for explaining the configuration of the hidden code analysis unit 150 according to an embodiment of the present invention. As shown in FIG. 5, the hidden code analysis unit 150 may comprise a pattern analysis unit 151 and a signature generation unit 153.

The pattern analysis unit 151 is provided to analyze the pattern of the hidden code (HC) and split the hidden code (HC) according to the analyzed pattern to generate a split CFG (3CFG).

Since hidden code (HC) consists of nodes containing many instructions starting from a conditional branch instruction, the graph and the pattern of executed instructions should be analyzed to obtain the information necessary to detect malicious code.

Accordingly, when the pattern analysis unit 151 analyzes the pattern of the hidden code (HC), it may mean analyzing the hidden code (HC) to find a node with a conditional branch instruction, that is, a branching node.

As shown in FIG. 5, the pattern analysis unit 151 may split the hidden code (HC) to generate at least one or more split CFG (3CFG), and generate a split CFG (3CFG) by splitting the hidden code (HC) based on the branching node.

In FIG. 5, for convenience of explanation, a conditional branch instruction, that is, a branching node, is shown as being connected to each other with a dotted line. However, two nodes connected by a dotted line mean the same branching node.

Additionally, the pattern analysis unit 151 may transmit the generated split CFG (3CFG) to the signature generation unit 153.

The signature generation unit 153 is provided to generate a signature for each split CFG (3CFG).

Since generating a signature for each of the split CFGs (3CFGs) by the signature generation unit 153 is the same as calculating the signature of the program used in the static analysis method or can be sufficiently inferred from this, a detailed description will be omitted.

When signature generation for each of the split CFGs (3CFGs) are completed through this process, the hidden code analysis unit 150 compares the generated signatures with a database storing signatures of malicious code prepared in advance.

Therefore, if the generated signature exists in the database, the hidden code analysis unit 150 may determine that the hidden code including the corresponding split CFG (3CFG) is malicious code and detect a malicious behavior of the program.

Through this, the apparatus 100 according to this embodiment can shorten the time required to discover and respond to new types of malicious code by extracting hidden codes related to a malicious behavior and detecting a malicious behavior.

Figure 6:
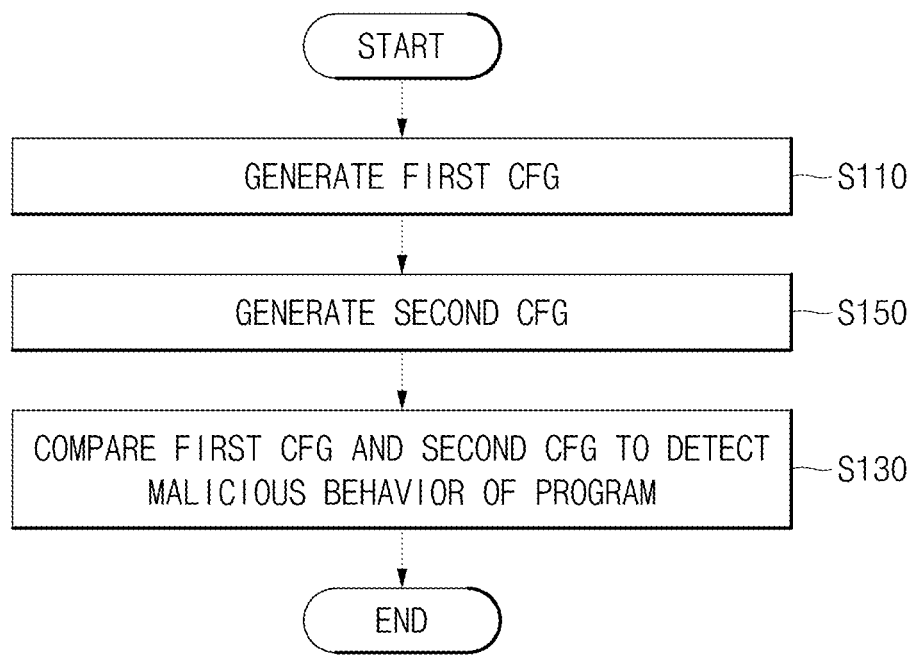
FIG. 6 is a flowchart illustrating a method for detecting malicious behavior according to an embodiment of the present invention.

Meanwhile, FIG. 6 is a flowchart for explaining a method for detecting a malicious behavior according to an embodiment of the present invention. Since the method for detecting a malicious behavior according to an embodiment of the present invention proceeds on the configuration that is substantially same as the apparatus 100 for detecting a malicious behavior shown in FIG. 1, the same reference numerals are assigned to the same components as the malicious behavior detection apparatus 100 of FIG. 1, and repeated descriptions are omitted.

The malicious behavior detection method according to this embodiment comprises a step of generating a first CFG (S110), a step of generating a second CFG (2CFG) (S130), and comparing the first CFG and the second CFG to detect a malicious behavior of the program (S150).

In the step of generating the first CFG (S110), the information extraction unit 110 may generate the first CFG (1CFG) by performing dynamic analysis on the program.

In the step of generating the second CFG (S130), the code execution unit 110 may generate a second CFG (2CFG) by extracting a code block that is likely to be executed by a conditional branch instruction included in the program.

In the step of generating the second CFG (S130), the code execution unit 110 may generate the second CFG (2CFG) while executing the program using the forced execution engine 131.

The step of generating the second CFG (S130) may comprise the step of the code execution unit 110 setting the entry point of the program as the starting point of the forced execution engine 131.

In addition, the step of generating the second CFG (S130) may comprise the step of the code execution unit 110 detecting whether a conditional branch instruction exists in the confirmed node while executing the program using the forced execution engine 131.

In the step of detecting whether a conditional branch instruction exists, if a conditional branch instruction exists in the confirmed node, a second CFG (2CFG) may be generated by setting the target address of the conditional branch instruction to the root node, and repeatedly calling the root node so as to operate recursively to extract all nodes that are likely to be executed as a code block.

Additionally, in the step of detecting whether a conditional branch instruction exists, the code execution unit 110 can prevent duplicate inspection by checking whether each confirmed node has a history of inspection through a preset function.

Meanwhile, the step of detecting a malicious behavior of the program by comparing the first CFG and the second CFG (S150) may comprise the step of the hidden code analysis unit 150 comparing the first CFG (1CFG) and the second CFG (2CFG) to detect hidden code (HC) included in the program, and detecting a malicious behavior of the program by determining whether the detected hidden code (HC) is malicious code.

Here, the hidden code (HC) may mean code that exists in the second CFG (2CFG) but does not exist in the first CFG (1CFG).

The step of detecting malicious behavior (S150) may comprise the step of the hidden code analysis unit 150 analyzing the pattern of the hidden code (HC) and splitting the hidden code (HC) to at least one or more to generate a split CFG (3CFG).

The step of detecting malicious behavior (S150) may comprise the step of the hidden code analysis unit 150 generating a signature for each split CFG (3CFG).

In addition, the step of detecting malicious behavior (S150) may comprise the step of the hidden code analysis unit 150 determining that the hidden code (HC) is malicious code if the generated signature exists in the database storing the signature of the malicious code prepared in advance.

The malicious behavior detection method of the present invention can be implemented in the form of program instructions that can be executed through various computer components and recorded on a computer-readable recording medium. The computer-readable recording medium may include program instructions, data files, data structures, etc., singly or in combination.

The program instructions recorded on the computer-readable recording medium may be specially designed and configured for the present invention, or may be known and usable by those skilled in the computer software field.

Examples of the computer-readable recording media include magnetic media such as hard disks, floppy disks and magnetic tapes, optical recording media such as CD-ROMs and DVDs, and magneto-optical media such as floptical disks, and hardware devices specifically configured to store and perform program instructions, such as ROM, RAM, flash memory, etc.

Examples of the program instructions include not only machine language code such as that generated by a compiler, but also high-level language code that can be executed by a computer using an interpreter or the like. The hardware device may be configured to operate as one or more software modules to perform processing according to the invention and vice versa.

Although various embodiments of the present invention have been shown and described above, the present invention is not limited to the specific embodiments described above. The present invention can be modified and practiced by those skilled in the technical field to which the present invention pertains without departing from the gist of the present invention claimed in the claims, and these modifications should not be individually understood from the technical spirit or perspective of the present invention.

REFERENCE NUMERAL

100: malicious behavior detection apparatus 110: information extraction unit
130: code execution unit 131: forced execution engine
150: hidden code analysis unit 151: pattern analysis unit
153: signature generation unit

The invention claimed is:

1. A method for detecting a malicious behavior in a malicious behavior detection apparatus that detects a malicious behavior by analyzing a code of a program comprising:

generating a first control flow graph (CFG) by performing dynamic analysis on the program;
generating a second CFG by extracting a code block that is likely to be executed by a conditional branch instruction included in the program; and
comparing the first CFG and the second CFG to detect hidden code included in the program, and detecting a malicious behavior of the program by determining whether the detected hidden code is a malicious code,
wherein the hidden code is code that does not exist in the first CFG, which is generated through code that is executed when the program's execution results are not affected by not manipulating the program's execution flow, but exists in the second CFG,
wherein the detecting the malicious behavior comprises,
analyzing a pattern of the hidden code to find a branching node among the nodes included in the hidden code and splitting the hidden code into at least one or more based on the branching node to generate a split CFG;
generating a signature for each split CFG; and
determining that the hidden code is a malicious code in response to determining the generated signature exists in a database storing signatures of malicious code prepared in advance.

2. The method of claim 1, wherein the generating the second CFG comprises:
generating the second CFG while executing the program using a forced execution engine.

3. The method of claim 2, wherein the generating the second CFG comprises:
setting an entry point of the program as a starting point of the forced execution engine; and
detecting whether the conditional branch instruction exists in a confirmed node while executing the program using the forced execution engine.

4. The method of claim 3, wherein the detecting whether the conditional branch instruction exists comprises:
setting, in response to determining that the conditional branch instruction exists in the confirmed node, a target address of the conditional branch instruction to a root node, repeatedly calling the root node so as to operate recursively to extract all nodes that are likely to be executed as the code block, and generating the second CFG.

5. The method of claim 4, wherein the detecting whether the conditional branch instruction exists comprises:
preventing duplicate inspection by checking whether each confirmed node has a history of inspection through a preset function.

6. A non-transitory computer-readable recording medium having stored thereon a computer program comprising instructions that, when executed by a processor, cause the processor to:
generate a first control flow graph (CFG) by performing dynamic analysis on the program;
generate a second CFG by extracting a code block that is likely to be executed by a conditional branch instruction included in the program; and
compare the first CFG and the second CFG to detect hidden code included in the program, and detect a malicious behavior of the program by determining whether the detected hidden code is a malicious code,
wherein the hidden code is code that does not exist in the first CFG, which is generated through code that is executed when the program's execution results are not affected by not manipulating the program's execution flow, but exists in the second CFG, wherein the detection of the malicious behavior comprises, analyzing a pattern of the hidden code to find a branching node among the nodes included in the hidden code and splitting the hidden code into at least one or more based on the branching node to generate a split CFG;

generating a signature for each split CFG; and determining that the hidden code is a malicious code if the generated signature exists in a database storing signatures of malicious code prepared in advance.

7. A malicious behavior detection apparatus for detecting a malicious behavior by analyzing a code of a program comprising:

one or more processors; and a memory for storing one or more instructions, wherein the one or more processors execute the stored one or more instructions to perform operations comprising, generating a first control flow graph (CFG) by performing dynamic analysis on the program;

generating a second CFG by extracting a code block that is likely to be executed by a conditional branch instruction included in the program; and comparing the first CFG and the second CFG to detect hidden code included in the program, and detecting a malicious behavior of the program by determining whether the detected hidden code is a malicious code, wherein the hidden code is code that does not exist in the first CFG, which is generated through code that is executed when the program's execution results are not affected by not manipulating the program's execution flow, but exists in the second CFG, wherein the detecting the malicious behavior comprises, analyzing a pattern of the hidden code to find a branching node among the nodes included in the hidden code and splitting the hidden code into at least one or more based on the branching node to generate a split CFG;

generating a signature for each split CFG; and determining that the hidden code is a malicious code in response to determining that the generated signature exists in a database storing signatures of malicious code prepared in advance.

8. The apparatus of claim 7, wherein the generating the second CFG comprises:

generating the second CFG while executing the program using a forced execution engine.

9. The apparatus of claim 8, wherein the generating the second CFG comprises:

setting an entry point of the program as a starting point of the forced execution engine and detecting whether the conditional branch instruction exists in a confirmed node while executing the program using the forced execution engine.

10. The apparatus of claim 9, wherein the generating the second CGF comprises:

setting, in response to determining that the conditional branch instruction exists in the confirmed node, a target address of the conditional branch instruction to a root node, repeatedly calling the root node so as to operate recursively to extract all nodes that are likely to be executed as the code block, and generating the second CFG.

11. The apparatus of claim 10, wherein the generating the second CFG comprises:

preventing duplicate inspection by checking whether each confirmed node has a history of inspection through a preset function.

\* \* \* \* \*